US012751432B2

(12) United States Patent
Hahn

(10) Patent No.: US 12,751,432 B2
(45) Date of Patent: Oct. 6, 2026

(54) HIVE FEED APPARATUS AND METHOD

(71) Applicant: FORMTECH PLASTICS INC., Calgary (CA)

(72) Inventor: Ralph Steven Hahn, Calgary (CA)

(73) Assignee: FORMTECH PLASTICS INC., Calgary (CA)

( * ) Notice: Subject to any disclaimer, the term of this patent is extended or adjusted under 35 U.S.C. 154(b) by 0 days.

(21) Appl. No.: 18/883,897

(22) Filed: Sep. 12, 2024

(65) Prior Publication Data

US 2025/0098647 A1 Mar. 27, 2025

Related U.S. Application Data

(60) Provisional application No. 63/584,401, filed on Sep. 21, 2023.

(51) Int. Cl.
*A01K 47/06* (2006.01)

(52) U.S. Cl.
CPC .................................... *A01K 47/06* (2013.01)

(58) Field of Classification Search
CPC ........ A01K 47/06; A01K 53/00; A01K 47/00; A23K 20/163
USPC ....... 449/3, 9, 10, 11; 119/6.5; 220/560, 574
See application file for complete search history.

(56) References Cited

U.S. PATENT DOCUMENTS 69,428 A * 10/1867 Harrison ................ A01K 53/00 449/10
334,914 A * 1/1886 Ward ..................... A01K 53/00 449/10
968,613 A * 8/1910 Van Ostrand ............ A01K 7/00 119/900
1,108,277 A * 8/1914 Thale ..................... A01K 53/00 449/10
1,208,482 A * 12/1916 Cheney .................. A01K 47/06 449/23
1,414,284 A * 4/1922 Jones ..................... A01K 53/00 449/9
1,607,659 A * 11/1926 Will ....................... A01K 53/00 449/15
1,801,932 A * 4/1931 Miller .................. A01K 39/026 119/77
2,496,285 A * 2/1950 Goebel .................. A01K 53/00 449/11

(Continued)

OTHER PUBLICATIONS https://bcbeesupply.com/products/feeder-frame-single-cap-ladder, May 29, 2023.

(Continued)

*Primary Examiner* — Maria E Graber
(74) *Attorney, Agent, or Firm* — Bennett Jones LLP

(57) ABSTRACT

An insert plate for a bee hive feeding pan fits into a feeding pan that has a tower portion through which bees enter the pan. The insert plate includes: a main body constructed of a material floatable on water and including an edge positionable adjacent the tower portion, and a gasket portion coupled to the main body extending away from the edge and being flexible, wherein the gasket portion is configured to bridge a gap between the edge and the tower portion when the insert plate is floating on liquid in the bee hive feeding pan. The insert plate increases the area from which the bees can feed at the surface level of the food and the gasket portion acts as a bridge to facilitate passage of the bees from the tower portion to the insert plate.

3 Claims, 5 Drawing Sheets

(56) References Cited

U.S. PATENT DOCUMENTS

| | | | | | |
|---|---|---|---|---|---|
| 2,762,674 | A * | 9/1956 | Sauvago | A01K 97/06 | 312/305 |
| 2,899,018 | A * | 8/1959 | Booth | F16N 7/34 | 239/326 |
| 3,589,340 | A * | 6/1971 | Beliles | A01K 5/01 | 119/61.54 |
| 3,626,902 | A * | 12/1971 | Orfei | A01K 67/30 | 119/6.5 |
| 5,207,743 | A * | 5/1993 | Costarella | A47G 19/065 | 220/574 |
| 5,249,700 | A * | 10/1993 | Dumke | A47G 19/065 | 220/574 |
| 5,695,052 | A * | 12/1997 | Damato | A47G 19/065 | 206/217 |
| 6,439,388 | B1 * | 8/2002 | Lerner | A47G 19/065 | 206/562 |
| 9,526,233 | B2 * | 12/2016 | Collinson | A01K 47/06 | |
| 10,485,225 | B1 * | 11/2019 | Jester | A01K 53/00 | |
| 10,617,100 | B1 * | 4/2020 | Larsen | A01K 53/00 | |
| 10,694,721 | B2 * | 6/2020 | Solano | A01K 53/00 | |
| 11,310,994 | B2 * | 4/2022 | Casale | A01K 5/0121 | |
| 11,324,205 | B2 * | 5/2022 | Krause | A01K 47/06 | |
| 11,369,090 | B2 * | 6/2022 | Lubic | A01K 39/026 | |
| 11,666,038 | B2 * | 6/2023 | Woods | A01K 53/00 | 449/2 |
| 2003/0218016 | A1 * | 11/2003 | Iskierka | A47G 19/2211 | 220/578 |
| 2014/0367392 | A1 * | 12/2014 | McClinton | A47G 19/065 | 220/574 |
| 2015/0216338 | A1 * | 8/2015 | Shendelman | A47G 19/065 | 220/574 |
| 2018/0084763 | A1 * | 3/2018 | Solano | A01K 53/00 | |
| 2021/0007332 | A1 * | 1/2021 | Gerogiannis | A01K 53/00 | |
| 2023/0263193 | A1 * | 8/2023 | Reynolds | B65D 53/02 | 99/467 |

OTHER PUBLICATIONS https://www.amazon.ca/Beehive-Beekeeping-Supplies-Beekeeper-Capacitry, May 29, 2023.

* cited by examiner

HIVE FEED APPARATUS AND METHOD

BACKGROUND

In commercial beehive operations, it is often times beneficial to attach a feed apparatus to a beehive to provide a source for nutrients for the bees of the beehive. The feed apparatus often contains feed in the form of a liquid such as a water-based nutrient solution. By consumption and evaporation the surface level of the liquid feed can drop over time.

Also, sometimes bees can fall into the liquid feed and drown. This is at least an economic burden on the bee hive operations.

SUMMARY OF INVENTION

In accordance with a broad aspect of the present invention, there is provided an insert plate for a bee hive feeding pan is disclosed. A feeding pan has a tower portion through which bees enter the pan. The insert plate includes: a main body constructed of a material floatable on water and including an edge positionable adjacent the tower portion, and a gasket portion coupled to the main body extending away from the edge and being flexible, wherein the gasket portion is configured to bridge a gap between the edge and the tower portion when the insert plate is floating on liquid in the bee hive feeding pan.

In accordance with another broad aspect of the present invention, there is provided a bee hive feeding apparatus including a pan along with above insert plate. The pan includes a side wall and a floor, defining a reservoir, and a tower portion extending upwardly from the floor, the tower portion having an aperture permitting access from beneath the pan to the reservoir.

In accordance with yet another broad aspect of the present invention, there is provided a method for feeding a bee hive, comprising: installing a pan on top of the bee hive, the pan including: a side wall and a floor, defining a reservoir, and a tower portion extending upwardly from the floor, the tower portion having an aperture permitting access from beneath the pan to the reservoir; filling the pan with liquid feed; and installing an insert plate into the pan, the insert plate comprising: a main body constructed of a material floatable on the liquid feed and including an edge positioned adjacent the tower portion, and a gasket portion coupled to the main body extending away from the edge and being flexible, wherein the gasket portion is configured to bridge a gap between the edge and the tower portion when the insert plate is floating on liquid feed in the bee hive feeding pan.

It is to be understood that other aspects of the present invention will become readily apparent to those skilled in the art from the following detailed description, wherein various embodiments of the invention are shown and described by way of illustration. As will be realized, the invention is capable of other and different embodiments and its several details are capable of modification in various other respects, all within the present invention. Furthermore, the various embodiments described may be combined, mutatis mutandis, with other embodiments described herein. Accordingly, the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein.

(a)

(b)

(c)

(d)

DETAILED DESCRIPTION OF EMBODIMENTS

Figure 1:
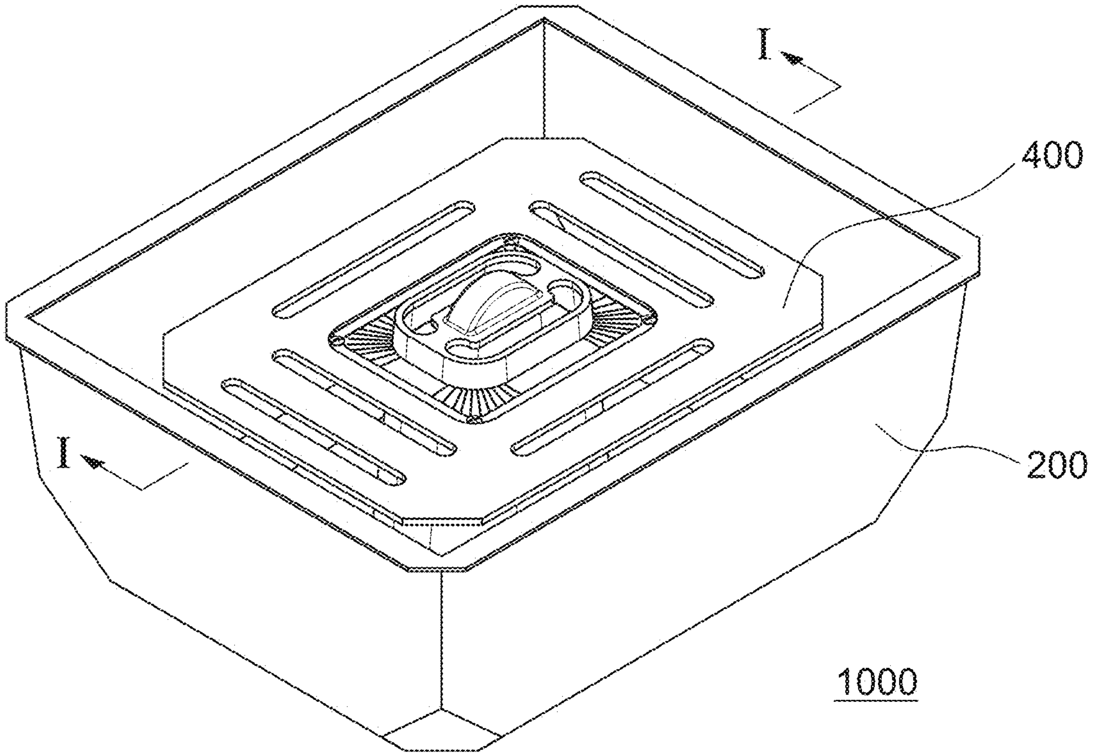
FIG. 1 is a perspective view of a hive feed apparatus according to one embodiment of the present invention.
Figure 2A:
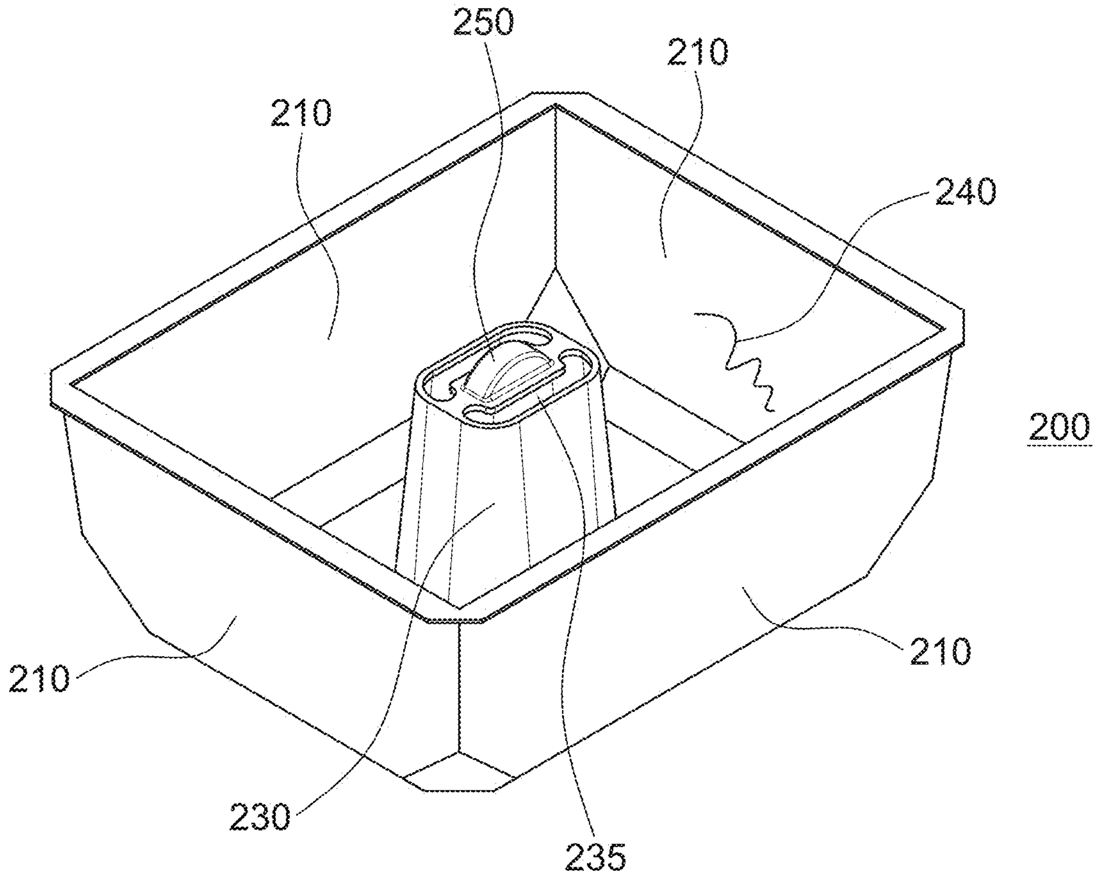
FIG. 2A is a perspective view of a pan of a hive feed apparatus according to another embodiment of the present invention.
Figure 2B:
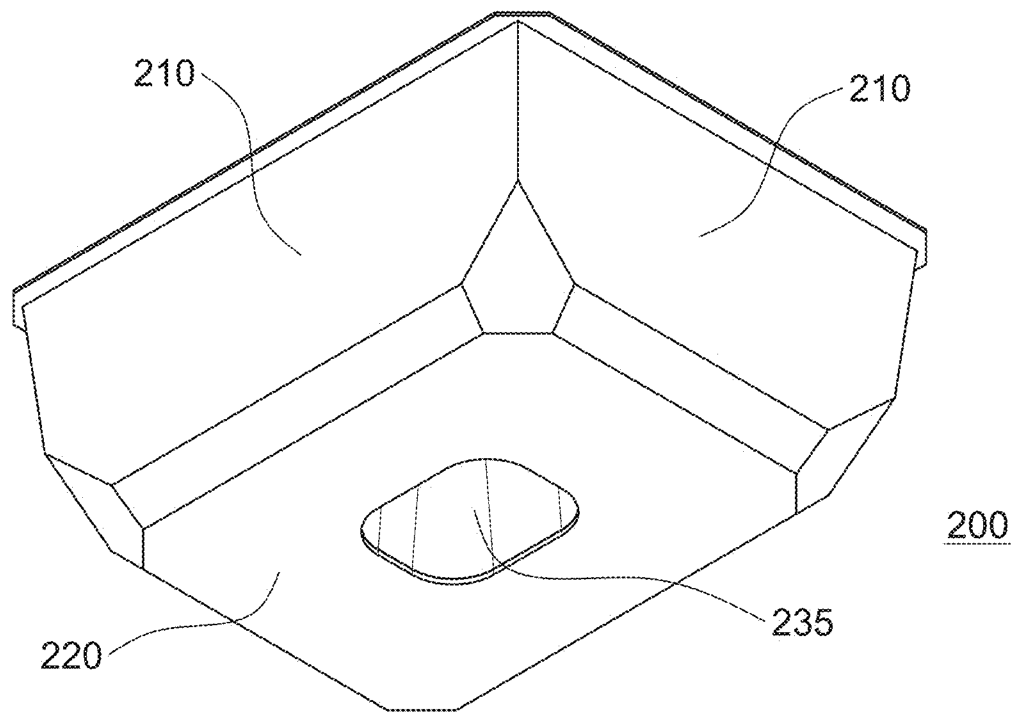
FIG. 2B is a bottom perspective of the pan of FIG. 2A.
Figure 3:
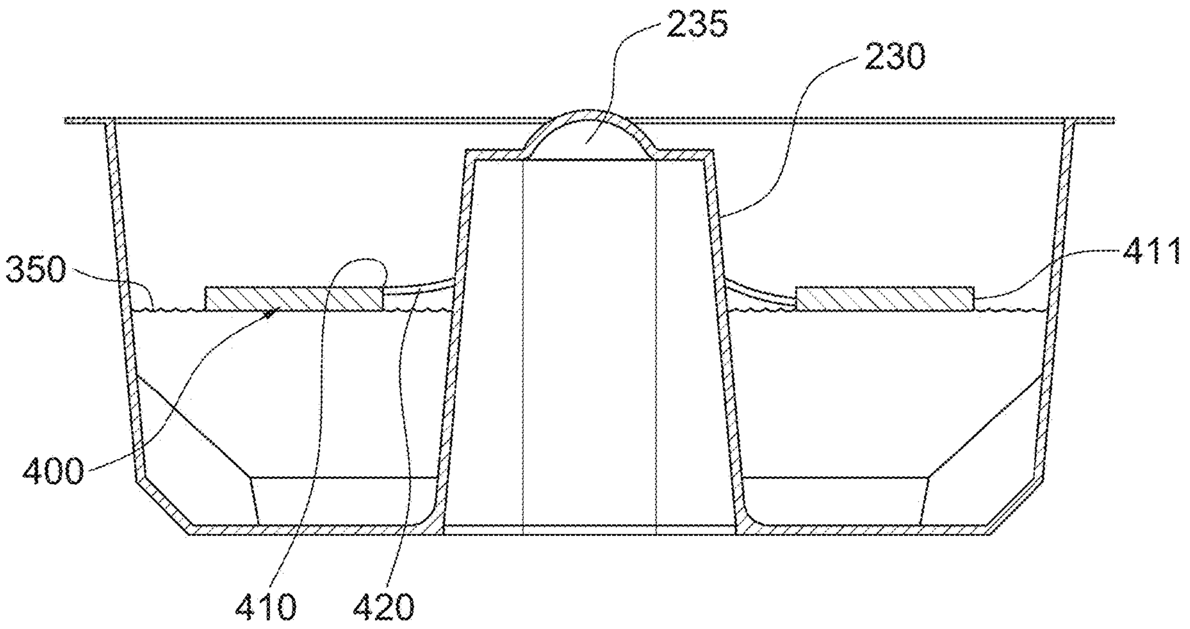
FIG. 3 is a cross sectional view along line I-I of the hive feed apparatus of FIG. 1 with feed therein; and (e)
Figure 4:
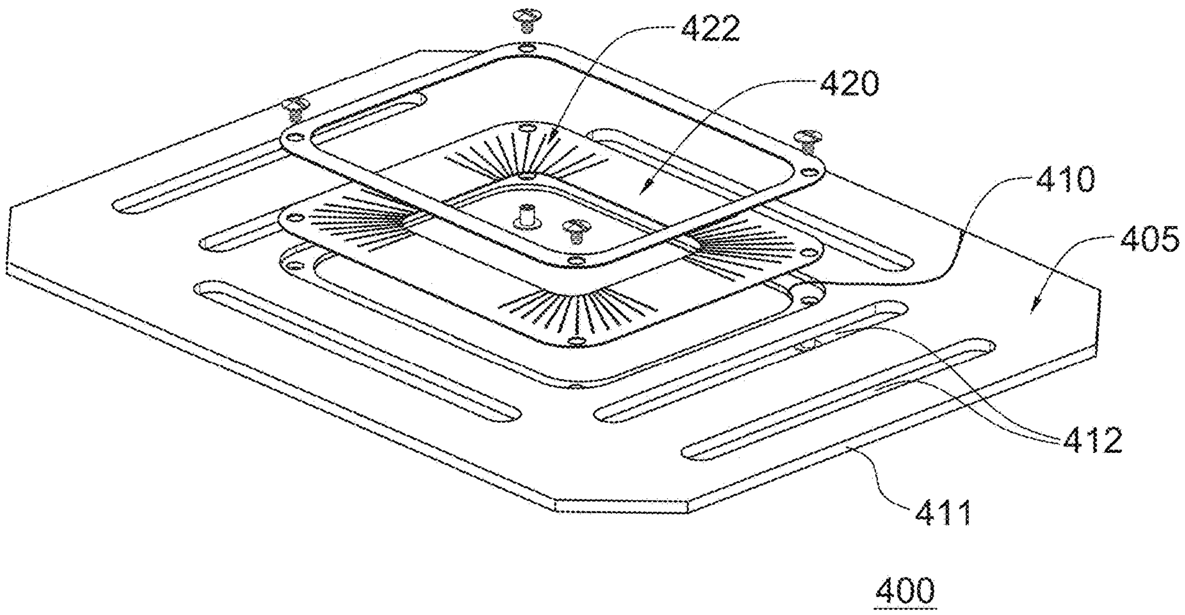
FIG. 4 is an exploded, top perspective view of an insert plate.

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

A feeder apparatus 1000 is provided. The apparatus may be used in conjunction with a hive such that bees can travel from the hive, into a feeding area of the apparatus to obtain food, and travel back into the hive. In comparison with the prior art, the present apparatus may provide a greater surface area of feed available to the bees, and/or a greater volume of feed that can be held in the reservoir. The apparatus also mitigates bees falling into the feed.

The apparatus may include a pan 200 and an insert plate 400. The pan may be used to contain food, and the pan may include a structure for permitting access to the food from a hive beneath the pan. The insert may be inserted into the pan, such that bees can walk onto or otherwise land on the insert and reside on the insert while feeding from the feed.

The pan may include one or more (as illustrated, four) side walls 210 and a floor 220, the side walls and floor defining a reservoir 240. In use, a volume of liquid (which may include food) may be deposited into the reservoir, thereby defining a surface level feed line 350 of the liquid. The feed line may become lower over time due to consumption and/or evaporation of the liquid and will move back up when the liquid feed is refilled.

The pan may be deeper than those of the prior art, permitting a greater volume to be held within the reservoir. The pan may, for example, have a reservoir volume of 25 litres, which is much larger than typical pans.

The pan may also include a tower portion 230 extending substantially upwardly from the floor of the pan. The tower portion may include an aperture 235 for access from beneath the pan to the reservoir. It is noted that the bees access the pan interior by moving up through the hollow interior of the tower portion 230, enter the reservoir 240 via the tower aperture 235 and walk down the outside of the tower to feed at surface level 350. A surface of the pan (including, for example, the aperture, inside and/or outside the tower, side walls, etc.) may be textured or roughed up to facilitate bee travel thereon. While the illustrated tower is centrally located it could be off-center or incorporated into a side wall 210.

The tower portion may include a handle 250 to facilitate lifting the pan. The pan may include a lid (not shown) or the hive lid (not shown) may be installed over the top of the pan.

The insert plate 400 includes a main body 405 with a construction and material that configures the insert plate 400 to float on the liquid and permits the bees to rest thereon, thereby using the insert plate like a platform at the surface level. The bee may be able to access the feed by resting on the insert at its edges. The material of construction may include, for example, a plate-shaped material with a density less than water such as a polymer, a foamed solid, etc.

As noted, insert plate 400 is intended to float and the liquid level can rise and fall. The insert must remain floating on the liquid, therefore, the insert can be any shape provided its edges are gapped away from the surface of the side walls and tower such that the plate doesn't get hung up on those surfaces. In the embodiment, main body 405 has an outer perimeter shape that roughly follows, but is slightly smaller than, the perimeter shape of walls 210 and main body 405 includes a notch or hole following but with dimensions slightly larger than the outer perimeter the shape of the tower. In one embodiment, the main body has an outer perimeter that is generally rectangular and includes a hole 410, which is fully through the thickness of the plate and fits over tower 230. The diameter dimension across the hole are slightly larger than the largest outer diameter of the tower 230. As such, the insert plate can be placed over the tower within the wall of the pan and can slide from top to bottom on the tower. For example, the insert may have two major side edges, two minor sides 411 and hole 410 centrally between the sides.

The main body may include one or more openings 412 through its thickness from the main body upper surface to the main body lower surface, providing more edge space where bees can access the liquid feed.

To prevent bees falling into the reservoir and drowning, insert plate 400 further includes a gasket portion 420 extending radially away from the edge nearest the tower. Gasket portion 420 bridges the gap between the edge of the main body that is nearest the tower and tower 230, such that bees can walk across the gasket portion when trying to access the main body 405. The gasket portion can extend away from the edge in an orientation that is substantially in plane or in a higher but parallel plane with the planar expanse of an upper surface of the main body. As such, when the main body is floating, the gasket portion 420 extends substantially parallel to, but above, the surface of the liquid feed.

In the illustrated embodiment, hole 410 is the edge of main body 405 that is closest the tower. The gasket portion 420 extends radially inward from the hole 410. Gasket portion 420 has a radial dimension from its base, coupled to main body, and its inner edge that bridges the gap between the hole 410 and tower 230 regardless of the vertical position of the insert with respect to the tower. Gasket portion 420 is flexible to be able to bias against the tower but also flex to move up and down along the tower outer surface, as the liquid level 350 rises and falls.

Gasket portion 420 can be constructed of various materials. In one embodiment, gasket portion 420 may be a brush seal, with bristles extending radially from hole 410.

In another embodiment, gasket portion 420 is an elastomeric sheet material extending radially inwardly from hole 410. The elastomeric sheet material may be a ring that extends fully around the perimeter of the hole 410. In one embodiment, the gasket portion may include slits 422 extending from its inner edge towards its base or outer edge to facilitate the gasket's ability to flex and lay substantially flat. For example, slits 422 may be useful at the corners of the hole, when it is has a rounded, rectangular shape.

Gasket portion 420 can be coupled to main body 405 in various ways. For example, the gasket portion may be integral with the main body. Main body 405 may be connected to gasket portion 420 with fasteners, snaps, adhesives, welding, etc. In one embodiment a retainer 430 may be secured to gasket portion 420 and main body 405 by fasteners, snaps, etc.

Apparatus 1000 therefore provides a good feeding solution for bee keepers. It can be installed on top of a bee hive and the pan can accommodate a volume of liquid feed. Because pan is deep, it can accommodate a large volume of liquid, thereby reducing the need to refill it.

Insert plate 400 is therefore configured to float on the surface of the volume of liquid in the reservoir, such that as the volume depletes (e.g., by consumption by the bees, by evaporation, or otherwise), the insert plate 400 continues to act as a feeding platform for the bees.

Bees may travel from the hive, up through the tower and its aperture, and down toward the feed line. The bees can walk across the gasket portion 420 to the main body 405 of insert plate 400 where they may feed at the perimeter edges 410, 411 and at openings 412. Gasket portion 420 spans the gap between the tower and the main body, regardless of the liquid level, so that a bridge is provided for bees to walk from the tower to the insert plate. After feeding, the bees can travel back over the gasket portion, onto the tower, up to the aperture, down the tower and back to the hive.

The loss of bees due to drowning is greatly reduced.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element or step. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims. All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A bee hive feed apparatus, comprising:
a pan, including
side wall and a floor, defining a reservoir, and
a tower portion extending upwardly from the floor, the tower portion having an aperture permitting access from beneath the pan to the reservoir, wherein the tower portion has a position centrally on the floor spaced from the side wall; and
an insert plate including
a main body constructed of a material floatable on water and including a hole in the main body sized to fit over the tower portion, the hole defined within an edge and the insert plate configured to be positioned directly adjacent to and surrounding the tower portion and free to ride up and down along the tower portion with changing water levels within the pan.

2. The bee hive feed apparatus of claim 1, further comprising openings passing from a top surface to a bottom surface of the main body.

3. A method for feeding a bee hive, comprising:
installing a pan on a surface open to the bee hive, the pan including:
a side wall and a floor, defining a reservoir, and
a tower portion extending upwardly from the floor, wherein the tower portion has a position centrally on the floor spaced from the side wall, the tower portion having an aperture permitting access from beneath the pan to the reservoir;
filling the pan with liquid feed; and
installing an insert plate into the pan, the insert plate comprising:
a main body constructed of a material floatable on the liquid feed and including a hole in the main body sized to fit over the tower portion, the hole defined within an edge positioned adjacent to and surrounding the tower portion; and
leaving the insert plate within the pan floating on the liquid feed in the pan, wherein the insert plate rides up and down along the tower portion and presents a platform on which bees from the bee hive can feed.

* * * * *